UNITED STATES PATENT OFFICE.

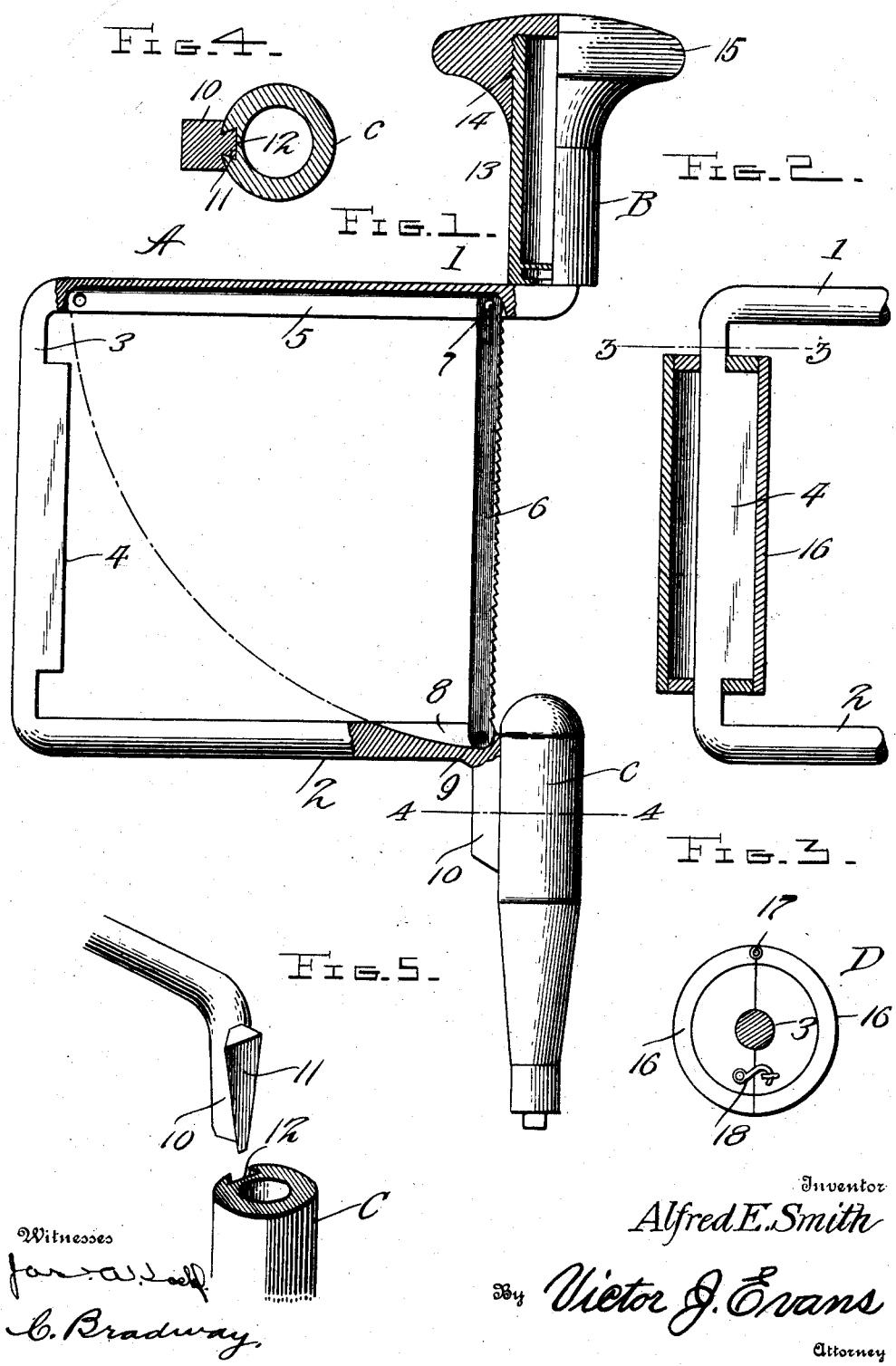

ALFRED E. SMITH, OF KELSO, WASHINGTON.

BRACE.

No. 901,395.   Specification of Letters Patent.   Patented Oct. 20, 1908.

Application filed October 24, 1907. Serial No. 399,015.

*To all whom it may concern:*

Be it known that I, ALFRED E. SMITH, a citizen of the United States, residing at Kelso, in the county of Cowlitz and State of Washington, have invented new and useful Improvements in Braces, of which the following is a specification.

This invention relates to a brace, and more particularly to a brace combined with a plurality of other tools.

The invention has for one of its objects to produce a combination tool so designed as to be extremely handy and having its various parts so arranged as to be conveniently converted for different uses.

A further object of the invention is the provision of a brace having a removable chuck which serves as a handle for a hand screw, awl, chisel, or the like, the various blades for use in the chuck being normally contained in the hollow handle of the brace.

A further object of the invention is the provision of a brace in which the bow of the shank thereof is formed into a drawing knife of which the handle and chuck of the brace constitute the grips of the drawing knife, the cutting edge of the drawing knife being normally closed in a removable case which forms one of the handles of the brace.

Another object is the provision of a brace having means for attaching a saw-blade thereto so that the brace can be used as a hack saw, the blade of the saw being normally confined in a pocket formed in the shank of the brace.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a side view of the brace with parts in section and showing the same adapted for use as a hack-saw. Fig. 2 is a detail sectional view of the shank of the brace showing the casing for the drawing knife blade. Fig. 3 is a section on line 3—3, Fig. 2. Fig. 4 is a transverse section on line 4—4, Fig. 1. Fig. 5 is a fragmentary perspective view showing the means for detachably connecting the chuck of the brace with the shank.

Similar reference characters are employed to designate corresponding parts throughout the several views.

Referring to the drawing, A designates the bowed shank of the brace, to the top arm 1 of which is secured the handle B, and to the lower arm 2, the chuck C. The handle portion 3 of the shank is provided with a blade 4 for adapting the tool for use as a drawing knife, the handle B and chuck C forming the grips of the knife. The arm 1 has a longitudinal pocket 5 that is open at the side presented to the arm 2 and in this pocket is normally confined a hack saw blade 6 pivoted to the arm 1 at 7. The outer extremity of the arm 2 has a recess 8 in which the free end of the blade 6 is adapted to enter, there being a removable pin 9 for fastening the blade 6 to the arm 2 so as to fasten the blade in position. In using the tool as a hack-saw, chuck C or handle B, or both serve as grips.

The chuck C of the brace is designed for use as a grip for a hand tool such as a chisel, screw driver, awl or the like and for this purpose, it is detachably connected with the arm 2, the said arm having a depending extremity 10 formed with a wedge 11 which tapers downwardly and is of dove-tail cross section, as clearly shown in Fig. 5. The chuck C is provided with a longitudinally extending recess 12 shaped to correspond with the wedge so that the chuck can be removed by slipping the latter off in a direction away from the handle B, whereas a reverse movement engages the chuck with the shank of the brace. The pressure exerted on the brace when the latter is used for any purpose, exerts a tendency to wedge the chuck tighter on the shank, since the chuck tends to move upwardly and the shank downwardly. The various instruments to be used in the chuck are contained in the handle B which constitutes a holder, and for this purpose, the handle is in the form of a cylinder 13 on which is held by screw threads 14, the knob or grip 15, the knob being readily removed for permitting access to the tools contained in the handle.

Since the shank A of the brace is provided with a blade 4 at the handle portion, it is necessary to protect this blade so that the brace can be gripped for the purpose of turning the same. To this end, a hollow cylindrical sheath or grip D is provided which is preferably composed of two sections 16 hingedly connected at 17, so that they can be opened to be slipped on or off the handle portion 3 of the shank. If desired, the sections of the incasing grip D can be locked closed by means of a hook and eye fastening 16, Fig. 3.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:

1. A brace comprising a U-shaped shank, a chuck removably secured to one extremity of the shank, a handle connected with the other extremity in line with the chuck, in combination with a tool on the shank, and a removable housing fastened on the shank to inclose the tool and shaped to constitute a handle.

2. A brace comprising a shank, a handle secured to one extremity thereof, and a chuck secured to the other extremity, a tool on the shank, a cylindrical housing composed of two parts arranged to inclose the tool and form a handle for the brace, and means for fastening the two parts of the housing in place.

3. A brace comprising a shank having a slotted portion forming a pocket, a handle connected with one extremity of the shank, and a chuck connected with the other extremity, in combination with a saw blade pivoted at one end in the slot and adapted to swing into and out of the latter, and means for securing the free end of the blade to the shank to extend between the handle and chuck and in parallel relation thereto.

In testimony whereof I affix my signature in presence of two witnesses.

ALFRED E. SMITH.

Witnesses:
   Sam. Colins,
   M. Bixby, Jr.